June 6, 1967             J. H. MEYER             3,323,325
STRINGLESS BEADS HAVING FRICTIONALLY RETAINED INSERT
Filed Sept. 4, 1964
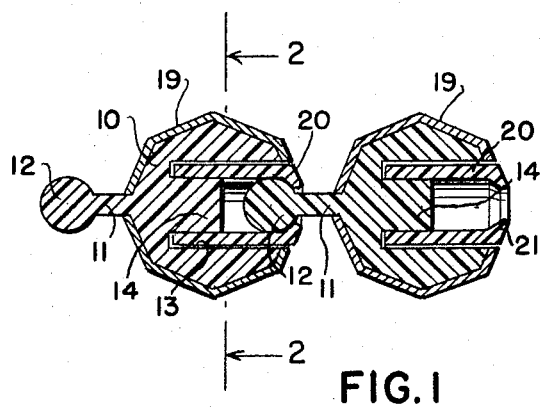 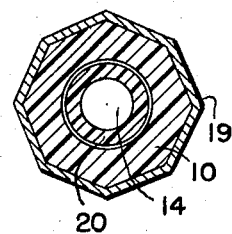
FIG. 1           FIG. 2
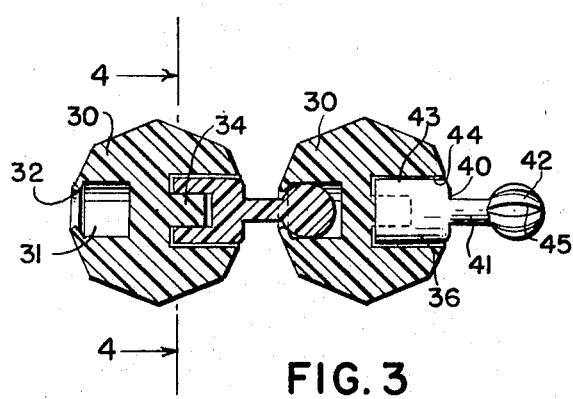 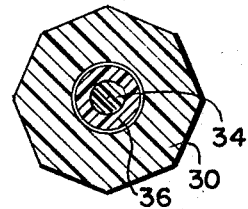
FIG. 3           FIG. 4
*INVENTOR.*
Joseph H. Meyer
ATTORNEYS.

_United States Patent Office_ 3,323,325
Patented June 6, 1967

3,323,325
STRINGLESS BEADS HAVING FRICTIONALLY RETAINED INSERT
Joseph H. Meyer, Rockville Centre, N.Y., assignor to Richelieu Licensing Corp., Holbrook, N.Y., a corporation of New York
Filed Sept. 4, 1964, Ser. No. 394,570
3 Claims. (Cl. 63—4)

This invention relates to ornamental beads and the like suitable for forming necklaces, bracelets and similar articles which include a series of connected beads or similar objects. The term "beads" will be used hereinafter to include all ornamental bodies adapted to be connected or joined together to form such ornamental series of objects.

This invention represents an improvement on the beads of U.S. Patent No. 3,066,501. Said Letters Patent discloses an improvement on U.S. Patent No. 2,714,269 which discloses for the first time a stringless series of beads releasably joined together in series by loose ball and socket joints. In said 2,714,269 patent the beads are formed entirely of polyethylene or similar plastic material so that the relatively elastic or flexible polyethylene forming the ball insert of one bead can be snapped through the smaller collar of the socket of the adjacent bead to form a fairly strong attachment between the beads which, on the other hand, can be disconnected only by a force which is greater than that to which a string of beads is ordinarily subjected.

Said Patent No. 3,066,501 is based on the discovery that only one part of each of the ball and socket joints of such a series of beads need be made of the flexible or elastic plastic material such as polyethylene and the invention of said patent makes use of this discovery by providing beads having an exterior surface of hard plastic or glass with one or more inserts of relative flexible and/or elastic plastic material such as polyethylene. Thus, it was possible, for the first time, thanks to the invention disclosed in 3,066,501, to produce stringless beads having sharp facets, water-clear bodies and the appearance of cut and/or polished gemstones.

With the latter type of bead, with the polyethylene or similar insert to form the socket of a ball and socket joint, it is also possible to apply coatings of various kinds which are not readily applicable or adherent or as suitable to the beads made completely of polyethylene as in the early Patent No. 2,714,269. However, certain coatings applicable to jewelry beads involve a heating step and such coatings are easiest to apply to the beads when fed as a substantially continuous series, i.e., after the beads have been interconnected. It is found, however, that when such a coating is applied to beads containing inserts, the outer portion of hard plastic or glass portion of the bead retains its shape but the polyethylene or similar insert shrinks, possibly due to an elastic memory. In any event the insert, normally held in place within the hard plastic shell of the bead by friction, shrinks enough to enable it to be pulled out of the outer shell before the head of the adjoining bead disconnects. This shrinkage takes place whether or not the beads are interconnected.

Among the objects of the present invention is to provide a bead comprising a hard outer shell and a relatively flexible or plastic insert adapted to form a socket or a ball connector element with the shell and insert so constructed that shrinkage of the insert does not loosen its attachment to its particular shell.

The objects of the invention are attained by providing the hard shell portion of the bead with a cavity to receive the insert which contains an integral post, stud or plug at the inner end of the cavity adapted to fit internally into the insert which, in turn, is open at the interior end to receive the post, plug or stud. When such a bead is heat treated, the insert still shrinks but it shrinks upon the said stud or plug.

The beads of the present invention may therefore, be strung, hung as a string or conveyed as a continuous string through coating baths and chambers without being separated due to the shrinkage of one or more of the inserts.

Among coatings that may be applied to such beads are metal coatings by thermal, decomposition of volatile metal compounds, sprayed-on or other coatings applied as liquid solutions or dispersions which are followed by a drying step, etc.

Suitable materials to form the shell or ordinarily observed portions of the beads are those materials which are hard enough to retain sharply faceted, reflective surfaces formed thereon, such as glass, wood, hard thermoplastic and thermosetting resinous materials such as polystyrene, polyamides, polyesters, cellulose derivatives such as cellulose acetate, butyrate, acetate-butyrate, etc., acrylate and methacrylate resins, polycarbonates, etc.

Suitable materials for the inserts include polyethylene, polypropylene, copolymers of ethylene and propylene and also many of the stiffer or tougher elastomeric materials such as gutta-percha and the tougher synthetic elastomers.

The invention, together with further advantages and objects thereof, will be better understood from the following description of specific embodiments thereof when read in connection with the accompanying drawing in which, FIG. 1 is a cross-sectional view of two connected beads formed according to the invention.

FIG. 2 is a cross-sectional view taken on line 2—2 of FIG. 1.

FIG. 3 is a cross-sectional view of two connected beads of modified form.

FIG. 4 is a cross-sectional view taken on line 4—4 of FIG. 3.

The beads of FIGS. 1 and 2 comprise the body or shell portion 10 and the insert portion 20. The shell portion 10 includes the integral neck 11 ending in the bead 12. The cylindrical cavity or opening 13 includes a stud or plug 14 at the end thereof.

The insert 20 is cylindrical with, however, an inwardly extending lip or flange 21 at the outer end with an opening that is smaller than the size of head 12. The insert 20 is made to fit very tightly within the cavity 13 and is ordinarily held in place by friction. The insert 20 is cylindrical throughout its length and when forced into the cavity 13 of shell 10 the inner end of said insert surrounds the stud 14. When these beads are heated to as much as 80° C. or more, the shell retains its shape or may even expand slightly, but the insert 20 shrinks away from the walls of the cavity 13 so that it would no longer be retained within the cavity if it were not for stud 14 upon which the inner end of the insert 20 shrinks to hold the latter firmly in place.

In the modified form of the device shown in FIGS. 3 and 4, the shell or body portion 30 contains the socket 31 for the ball or head 42 of the ball and socket joint. It is sometimes difficult to form the socket 31 with a large interior lip 32 in hard plastic shells by a single molding operation since if made too large, the core which forms the socket in molding cannot be withdrawn from the lip. However, a lip 32 of practically any size desired may be formed in a second molding operation by pressing the outer outer rim of the socket 31 from the outside. In this modification, the insert 40 with neck 41 and head 42 is made of flexible and/or somewhat elastic plastic material, for example, of polyethylene or polypropylene. To enable it to be compressed, the head may be formed with extra grooves 45 on the head 42 of FIG. 3. The interior end of insert 40 contains an opening 43 adapted to fit snugly over the plug or stud 34 in the body 30. The outer inserted portion 44 of insert 40 also fits snugly within the socket 36 of body 30.

A coating 19, shown somewhat exaggerated in thickness in FIGS. 1 and 2, which requires the application of heat during one or more steps involved in its application, may be applied to such beads without loosening the frictional attachment of the inserts to the body of the beads. Although it is possible to apply such coatings to the body or shells of the beads before forcing the inserts into place in the shells, such a process is not very practical, since the assembling machinery for the beads and inserts can injure the coating and since the coatings are much easier applied to continuous or relatively long strands of the assembled beads.

The features and principles underlying the invention described above in connection with specific exemplifications will suggest to those skilled in the art many other modifications thereof. It is accordingly desired that the appended claims shall not be limited to any specific feature or details thereof.

I claim:

1. In a stringless series comprising at least two beads interconnected by ball and socket joints each of said beads being of the type comprising a body, an interior socket on one side and a projecting neck on the other side ending in an enlarged head, said head and socket forming, respectively, the ball and socket of the ball and socket joints, each of said beads being a composite of two different materials comprising a body portion of relatively hard material having the property of retaining sharply faceted reflective surfaces formed thereon and an insert portion of relatively flexible, resilient material, at least one of the interior socket and the projecting neck portions of said composite bead being formed on the insert portion of said flexible plastic material, said body portion of said bead having a cavity containing said insert, said cavity comprising a wall and a bottom, said wall closely surrounding at least a portion of said insert, the improvement comprising, a stud on said body portion projecting from the bottom of said cavity, said insert portion containing an opening at the inner end thereof snugly surrounding said stud, said stud and insert opening comprising means whereby said composite beads may be heat treated without producing disengagement of the insert due to heat shrinkage of the latter.

2. The stringless series of beads as claimed in claim 1 wherein said insert forms the socket portion of the ball and socket joint and wherein the opening in said insert extends through the insert and surrounds the stud of the body at the innermost end thereof, the outer wall of said insert closely fitting within the cavity of said body portion.

3. The stringless series of beads as claimed in claim 1, wherein said insert forms the neck and ball portion of said ball and socket joint, said insert having its end portion opposite the neck and ball portion extending into the cavity of the body portion, said end portion having said opening at the very end surrounding said stud of the body portion and the outer wall of said end portion of the insert closely fitting within the wall of the cavity of said body portion.

References Cited

UNITED STATES PATENTS

| | | | |
|---|---|---|---|
| 2,714,269 | 8/1955 | Charles | 63—4 X |
| 3,066,501 | 12/1962 | Charles et al. | 63—2 |
| 3,226,807 | 1/1966 | Orr | 29—447 X |

F. BARRY SHAY, *Primary Examiner.*

RICHARD C. PINKHAM, *Examiner.*